United States Patent [19]
Hoffman et al.

[11] 3,816,343
[45] June 11, 1974

[54] KAOLINITE COATED WITH SYNTHESIZED LAYER-TYPE SILICATE MINERALS

[75] Inventors: George W. Hoffman; William T. Granquist, both of Houston, Tex.

[73] Assignee: N. L. Industries, Inc., New York, N.Y.

[22] Filed: Apr. 24, 1972

[21] Appl. No.: 246,995

[52] U.S. Cl............................................. 252/455 R
[51] Int. Cl............................................... B01j 11/40
[58] Field of Search ................................ 252/455 R

[56] References Cited
UNITED STATES PATENTS
3,244,643  4/1966  Schwartz .......................... 252/455 Z
3,654,141  4/1972  Maryland ......................... 252/455 Z

*Primary Examiner*—C. F. Dees
*Attorney, Agent, or Firm*—Delmar H. Larsen; Roy F. House; Fred Floersheimer

[57] ABSTRACT

Complexes of particles of kaolinite coated with a layer-type clay-like mineral as disclosed in U.S. Pat. No. 3,252,757, and having improved mechanical properties.

4 Claims, No Drawings

KAOLINITE COATED WITH SYNTHESIZED LAYER-TYPE SILICATE MINERALS

The present invention relates to synthetic clay-like minerals, and more particularly to an improved complex thereof with kaolinite.

Granquist U.S. Pat. No. 3,252,757 discloses the preparation and properties of a synthetic clay-like mineral of a novel type, and for which many uses have been taught in the patent, such as a catalyst, an insecticide carrier, a desiccant, a grease thickener of the organophilic silicate type, and the like. For some applications of the novel silicate mineral of the aforesaid Granquist patent, modified mechanical properties would be desirable. Thus, the Granquist material may be mixed with clays when used in certain types of catalytic processes, thus being subject to attrition during use, as indeed are all catalysts. A reduction in the rate of attrition would be desirable.

An object of the present invention is to provide a method for utilizing the synthetic silicate minerals of the type described in Granquist U.S. Pat. No. 3,252,757, so as to provide a more robust composite without detriment to the other desirable properties of the patented material.

Other objects of the invention will appear as the description thereof proceeds.

Granquist U.S. Pat. No. 3,252,757 is hereby incorporated herein by reference, so that the present invention may be described with its aid in a more readily understandable and more compact form.

Generally speaking, and in accordance with illustrative embodiments of our invention, we prepare the reaction mixtures disclosed in the aforesaid Granquist patent, and which in general correspond to claim 8 of the aforesaid patent. As taught therein, these reaction mixtures comprise water, a minor proportion of alumina, silica in the molar ratio to said alumina of 2.7 to 3.3, and a cation chosen from the group consisting of ammonium, sodium, lithium, potassium, calcium, barium, and strontium, and mixtures thereof, together with an equivalent amount of an anion chosen from the group consisting of hydroxyl and fluoride and mixtures thereof, said anion being present in the molar ratio to said alumina of 0.2 to 0.6. A typical procedure is given in detail in Example 1 of the aforementioned Granquist patent, which need not be repeated here.

The improvement in accordance with the invention over the aforesaid Granquist patent comprises the addition to the aforesaid aqueous reaction mixture of a quantity of kaolinite. The weight ratio of the solids in the reaction mixture (exclusive of the kaolinite) to the kaolinite which we add thereto is within the range of 5 : 1 to 1 : 5. We prefer and find best a weight ratio of close to 1 : 1, although any ratio within the range just stated gives products exhibiting the advantages of the invention.

Having commingled the kaolinite in the aqueous reaction mixture as just described, we then proceed as taught in the Granquist patent. We autoclave the mixture within the temperature range of 280° to 315°C. and maintain the mixture at this temperature for a sufficient period of time for the synthetic clay-like mineral disclosed in the Granquist patent to form. It appears that the kaolinite particles act as a type of matrix on which the synthesis of the layer-like clay mineral takes place, so that the end result is a complex which consists essentially of particles of kaolinite coated with the layer-type clay-like mineral.

As taught in the Granquist patent, the clay-like mineral resulting from the described synthesis has the empirical formula:

$$nSiO_2 : Al_2O_3 : mAB : xH_2O$$

where the layer lattices comprise said silica, said alumina, and said B, and where $n$ is from 2.4 to 3.0,
$m$ is made from 0.2 to 0.6,
A is one equivalent of an exchangeable cation having a valence not greater than 2, and external to the lattice,
B is chosen from the group of negative ions which consists of $F^-$, $OH^-$, $½ O^{--}$ and mixtures thereof, and is internal in the lattice, and
$x$ is from 2.0 to 3.5 at 50 percent relative humidity, said mineral being characterized by a $d_{001}$ spacing at said humidity within the range which extends from a lower limit of 10.4 A. to an upper limit of about 12.0 A. when A is monovalent, to about 14.7 A. when A is divalent, and to a value intermediate between 12.0 A. and 14.7 A. when A includes both monovalent and divalent cations.

The weight ratios of the solids in the reaction mixture to the added kaolinite will be substantially the same as the weight ratio for the complex as removed from the autoclave after the synthetic step; that is, the complex will likewise have a weight ratio of the clay-like mineral to the kaolinite within the range of from 5 : 1 to 1 : 5.

The complexes prepared in accordance with the present invention have surprising and desirable properties. For example, the compacted bulk density in pounds per cubic foot of a typical product prepared in accordance with the Granquist patent aforesaid and having a silica/alumina ratio of 2.4 : 1 is 65. The compact bulk density of a typical kaolinite is 38. If these are merely blended together in equal proportions by weight, the bulk density is 50; but if a complex is prepared in accordance with the invention, all other conditions being the same, the bulk density is substantially higher, viz, 60. The attrition properties are greatly improved. Thus, for a 1 : 1 complex, the attrition index (as understood in the catalytic cracking art) is 45, compared with 60 for the corresponding mechanical wet blend of the two phases.

We find further that over a very wide range indeed of weight ratios of synthetic clay-like mineral to kaolinite, the catalytic activity for hydrocarbon cracking remains substantially unaffected. The following table shows a series of seven complexes made in accordance with the invention in which the weight ratio of synthetic clay to kaolinite varied between extremes of 3 : 1 to 1 : 2. The first column gives the weight ratio of the two phases in the complex, the second column gives the per cent conversion of a standard cracking stock in a microactivity test, and the third column gives the per cent gasoline produced in the test. It will be seen that the figures vary only slightly over this wide range of ratios.

Table I

| Clay Mineral:Kaolinite | % Conversion | % Gasoline |
|---|---|---|
| 3 : 1 | 57 | 39 |
| 2.5 : 1 | 58 | 42 |

Table I-Continued

| Clay Mineral:Kaolinite | % Conversion | % Gasoline |
|---|---|---|
| 2   : 1 | 55 | 41 |
| 1.5 : 1 | 54 | 40 |
| 1   : 1 | 50 | 38 |
| 1   : 1.5 | 52 | 34 |
| 1   : 2 | 50 | 36 |

We have found that as much as five parts of kaolinite may be present for each part of synthetic clay-like mineral without adversely affecting the performance of the latter in a wide variety of uses, particularly as a catalyst. If less than one part of kaolinite is present for each part of synthetic clay-like mineral, the improvement in mechanical properties resulting from the kaolinite is not very large.

A particular use of our inventive complex, particularly for equal weight ratios of the two phases, is as a substitute for chalk, dicalcium phosphate and the like in toothpaste and powder-type dentifrice formulations.

It will be understood that while we have explained the invention with the aid of specific examples, nevertheless considerable variation is possible in choice of raw materials, proportions, processing conditions, and the like, within the broad scope of the invention as set forth in the claims that follow.

Having described the invention, we claim:

1. The process of preparing a synthetic layer-type mineral-kaolinite complex which consists in commingling kaolinite with a reaction mixture consisting essentially of:
   water;
   a minor proportion of alumina;
   silica in the molar ratio to said alumina of 2.7 to 3.3; and
   a cation chosen from the group consisting of ammonium, sodium, lithium, potassium, calcium, barium, and strontium, and mixtures thereof, together with an equivalent amount of an anion chosen from the group consisting of hydroxyl and fluorides and mixtures thereof, said anion being present in the molar ratio to said alumina of 0.2 to 0.6;
   thereafter autoclaving the mixture thus formed at a temperature within the range of 280° to 315°C. for a period of time sufficient for said reaction mixture to be converted to a layer-type clay-like mineral;
   and cooling said mixture and recovering said complex therefrom.

2. The process in accordance with claim 1 wherein the weight ratio of solids in said reaction mixture to said kaolinite is within the range of from 5 : 1 to 1 : 5.

3. A complex consisting essentially of particles of kaolinite coated with a layer-type mineral having the empirical formula:

$$n\text{SiO}_2 : \text{Al}_2\text{O}_3 : m\text{AB} : x\text{H}_2\text{O}$$

where the layer lattices comprise said silica, said alumina, and said B, and where
   $n$ is from 2.4 to 3.0,
   $m$ is from 0.2 to 0.6,
   A is one equivalent of an exchangeable cation having a valence not greater than 2, and is external to the lattice,
   B is chosen from the group of negative ions which consists of $F^-$, $OH^-$, $\frac{1}{2} O^{--}$ and mixtures thereof, and is internal in the lattice, and
   $x$ is from 2.0 to 3.5 at 50 percent relative humidity, said mineral being characterized by a $d_{001}$ spacing at said humidity within the range which extends from a lower limit of about 10.4 A. to an upper limit of about 12.0 A. when A is monovalent to about 14.7 A. when A is divalent, and to a value intermediate between 12.0 A. and 14.7 A. when A includes both monovalent and divalent cations;
   said complex exhibiting a higher bulk density than a mechanical mixture of the same said components of said clay-like mineral in said kaolinite.

4. A complex in accordance with claim 3 in which the weight ratio of said layer-type mineral to said kaolinite is within the range of from 5:1 to 1:5.

* * * * *